# United States Patent Office 2,971,821
Patented Feb. 14, 1961

2,971,821

SEED FOR PRODUCTON OF RUTILE TITANIUM DIOXIDE PIGMENT AND PROCESS

Frank O. Rummery, Reuben Roseman, Frederick L. Appel, and Paul S. Hamshey, Jr., Baltimore, Md., assignors to The Glidden Company, Cleveland, Ohio, a corporation of Ohio No Drawing. Filed Jan. 13, 1958, Ser. No. 708,363

18 Claims. (Cl. 23—202)

This invention relates to a process for the production of rutile titanium dioxide pigments, to a novel seed composition for said process, and to a process for preparing a stable colloidal rutile-inducing and yield-inducing seed.

In the manufacture of titanium dioxide from titanium-bearing ores and slags it is conventional to treat the crude material or mixtures thereof with sulfuric acid to obtain a digestion mass or cake comprising largely acid- and water-soluble sulfates of titanium, iron and minor impurities. In practice, ilmenite ore and/or titanium-bearing slags are comminuted and then reacted at elevated temperatures with concentrated sulfuric acid in a suitable vessel to form the metallic sulfates preparatory to recovery of the titanium values in the form of hydrous titanium oxide. The liquor resulting from the treatment of ilmenite with sulfuric acid, after clarification and concentration, is treated with a seeding agent and then heated near or to the boiling point to effect hydrolysis of the titanium oxide values. The resulting precipitated titanium hydrate is filtered out, washed, dried, calcined and ground, being then ready for use as a pigment.

The best known titanium dioxide pigments, namely, rutile and anatase, have heretofore been prepared generally by the method mentioned above and these pigments possess many desirable properties. Of the two titanium dioxide pigments, rutile titanium dioxide is perhaps the most desirable due to its optimum tinting strength and other physical and chemical characteristics well known to those skilled in the art.

As will be brought out hereinafter, our invention is especially adapted for the preparation of rutile titanium dioxide by a novel process which is an improvement over the heretofore known methods of preparing said pigment.

In general, the hydrolysis of titanium sulfate solutions to yield precipitates which, upon washing, drying and calcining, form either anatase or rutile, is governed by the character of the seed used in said hydrolysis. In the production of rutile titanium dioxide it is important that the seed employed be of a small particle size and that it be in the form of a suitable hydrous titanium oxide sol (or washed coagulum thereof) which will disperse readily in a titanium sulfate solution. When such seed is incorporated in small quantities into a titanium sulfate solution, essentially only the titanium values will precipitate upon hydrolysis, even though the solution itself may contain other salts, such as iron and aluminum sulfates, which remain in solution. Hydrolysis is usually effected by heating the material at preferably near the the boiling point of the solution at atmospheric or higher pressures until substantially all of the titanium values have been precipitated.

Titanium sulfate solutions, alone, can be only incompletely hydrolyzed by heating; the metatitanic acid so produced yields, on calcination, pigment of poor quality. However, if yield- and rutile-inducing seed is added prior to hydrolysis, then the metatitanic acid obtained results in high-quality $TiO_2$ pigment on calcination.

Many methods for preparing suitable rutile- and yield-inducing seeds have been proposed, and some of these have been used commercially in the preparation of titanium dioxide pigments. In some of these well known prior art methods the seeds have been prepared by peptizing and heating orthotitanic acid in the presence of a monobasic acid, typically hydrochloric acid, usually at concentrations of 20 to 60 grams $TiO_2$ per liter but, to the best of our knowledge, never in concentrations higher than 90 grams of $TiO_2$ per liter. In some of these prior art methods, that is, where a mixture of orthotitanic acid and an aqueous inorganic acid such as hydrochloric, hydrobromic, hydriodic or nitric acid is employed in the preparation of rutile-inducing seeds, the inorganic acid is employed in an amount less than the stoichiometric amount based on the $TiO_2$ content. The highest prior art seed concentrations of which we are aware have been achieved through the use of hydrochloric acid in association with anions such as sulfate or citrate. We have, however, not been aware of any process prior to ours, for the preparation of stable rutile- and yield-inducing seeds of concentrations above 90 grams $TiO_2$ per liter, and possessing optimum characteristics, which seeds employed in amounts of 1% or less would possess all of the requisite virtues for successfully hydrolyzing titanium sulfate solutions in the preparation of rutile titanium dioxide pigments.

An object of our invention is the provision of an improved process for the manufacture of rutile titanium dioxide pigments.

Another object of our invention is a process for the preparation of stable colloidal rutile-inducing and yield-inducing seeds for use in the hydrolysis of titanium-bearing solutions.

Still further objects of our invention are: the provision of novel seed compositions; novel seed compositions containing concentrations of over 90 grams $TiO_2$ per liter; novel seed compositions which can be readily prepared at room temperature; and, in general, a process employing the seeds of our invention which is an improvement over heretofore known methods of manufacturing rutile titanium dioxide.

We have found that by employing a combination of hydrofluoric acid or a hydrofluoric acid-forming material with an inorganic acid selected from the group consisting of hydrochloric acid, hydrobromic acid, hydriodic acid and nitric acid in the preparation of the seeds of our invention, we have surprisingly obtained stable colloidal rutile-inducing and yield-inducing seeds which are eminently suitable for the hydrolysis of titanium sulfate solutions in the manufacture of titanium dioxide pigments.

Our invention, therefore, broadly comprises a new stable colloidal rutile-inducing and yield-inducing seed, a process for its preparation, and an improved process for the manufacture of titanium dioxide pigments, as will be fully illustrated in the specification of our invention.

Our novel discovery concerning the employment of combinations of hydrofluoric acid or a hydrofluoric acid-forming compound with an inorganic acid selected from the group consisting of hydrochloric acid, hydrobromic acid, hydriodic acid and nitric acid, in the preparation of hydrated titania seeds for use in the hydrolysis of titanium sulfate solutions, was unexpected and, as will be shown hereinafter, our seeds are strikingly superior to well known prior art seeds. In the description of our invention to follow, emphasis will be placed on the employment of the inorganic acids hydrofluoric acid and hydrochloric acid in our process, and this combination is presently preferred.

The effectiveness of the combination of hydrofluoric acid and hydrochloric acid in our seeds appears to result from synergism of the two materials. Whatever the principle of the coaction is, it should be understood that we are not limited to any theory. Thus, we have found that other things being equal, for example, using like and minimal amounts of seed-$TiO_2$ in the hydrolysis of a titanium sulfate solution.

(1) While the use of hydrochloric acid alone in the preparation of seeds having the desirable concentrations of 60 grams $TiO_2$ per liter and above gives rise to "hydrolyzates" (metatitanic acid) not too readily convertible to rutile (relatively high temperatures being required), the products then being of non-optimum quality; and (2) While the use of hydrofluoric acid alone in the preparation of seeds gives rise to hydrolyzates difficultly convertible to rutile (excessively high temperatures being required), the products then being of very poor quality;

(3) In contradistinction, our use of a synergistic combination of hydrochloric acid and hydrofluoric acid in the preparation of our seeds containing up to 180 grams $TiO_2$ per liter yields hydrolyzates readily convertible to high-quality rutile (relatively low temperatures being required), the products of our preferred practice being superior to pigments of the prior art.

In a broad application of our invention to the preparation of our novel seeds we employ, in association with hydrochloric acid, small quantities of hydrofluoric acid. The amount of hydrofluoric acid to be employed in the process of our invention varies broadly from 0.1% to 5% based on the weight of the titanium dioxide. Excellent results can be obtained with amounts in the order of from 1% to 3½% by weight. In regard to the amount of hydrochloric acid to be employed, we have found that amounts from 20% to 50% based on the weight of the titanium dioxide can be employed. We have obtained excellent results with from about 0.3 gram to 0.4 gram of hydrochloric acid per 1.0 gram of titanium dioxide.

Although as heretofore stated, seeds of titanium dioxide have been prepared by the prior art in concentrations of up to about 60-90 grams of $TiO_2$ per liter, we have found that we can prepare seeds of concentrations of up to about 180 grams of $TiO_2$ per liter. These higher concentrations provide, among other things, the distinct advantage of increased seed-$TiO_2$ productivity in given equipment.

In a preferred process for hydrolyzing a hydrolyzable titanium sulfate solution, we have found that we can employ amounts of our novel seed ranging from 0.5% to 1.5% by weight ($TiO_2$ basis) of the hydrolyzable $TiO_2$ to yield a rutile pigment superior to those heretofore known. Effective amounts of the seed that are normally employed are amounts in the order of 1% or less.

In one aspect of our invention the seeds are prepared by peptizing titanium orthohydrate in a mixture containing hydrochloric acid and a small quantity of hydrofluoric acid, followed by heating this mixture to form the desired dispersed seed. The heat can be applied to the outside of the containing vessel or it can be provided by heaters (e.g., steam coils) immersed in the admixture or it can be furnished by allowing steam to enter directly into the batch.

In the practical application of our finished colloidal seed dispersions to the hydrolysis of titanium sulfate solutions these seeds can be used directly, or where their inorganic monobasic acid contents are undesirable because of their corrosive action on certain types of plant equipment, they can be coagulated with alkali such as ammonium hydroxide followed by washing to remove halides. If the latter procedure is used, none of the good rutile- and yield-inducing qualities of our seeds is sacrificed thereby; and in this latter procedure the removal of halide is simplified as compared with the washing of prior art seeds because of our use of diminished monobasic acid:$TiO_2$ ratios.

In the specific examples to be presented hereinafter, the novel seeds of our invention were employed in hydrolyzing titanium sulfate solutions analyzing in the following range:

| | |
|---|---|
| Bé. at 60° C. | 54° to 55° |
| Reduced $TiO_2$ grams/liter | 2 to 3 |
| Total $TiO_2$ do | 225 to 235 |
| Fe do | 57 to 60 |
| Total $H_2SO_4$ do | 542 to 601 |
| Free $H_2SO_4$ do | 166 to 208 |
| Active $H_2SO_4$ do | 442 to 496 |
| Factor of acidity | 60 to 72 |

It should be understood that our novel seeds can be employed in the hydrolysis of titanium sulfate solutions varying considerably from the above values which are included here only for purposes of illustration and not of limitation.

While many methods of preparing orthotitanic acid are possible, all of which are operable for the purposes of our invention, the following will demonstrate a procedure by means of which the orthotitanic acid can be prepared in accordance with our teachings herein.

To a well-agitated solution of sodium carbonate containing 160 grams of $Na_2CO_3$ per liter there is added a relatively pure titanium sulfate solution obtained by dissolving washed metatitanic acid in sulfuric acid and containing 160 grams $TiO_2$ and 640 grams total sulfuric acid per liter. The addition of titanium sulfate is discontinued when a pH value of 8.5 is attained. The so-precipitated orthotitanic acid is filtered and washed sulfate-free.

To the so-prepared orthotitanic acid, contained in a suitable mixing vessel, there are added the hydrochloric acid and the hydrofluoric acid (the order of addition not being critical) preferably under conditions of vigorous agitation; and agitation is maintained for an additional period of time in order to insure complete homogeneity of the admixture. Stable efficacious colloidal seeds are then obtained by either (1) heating the mixture at relatively high temperatures for a short period of time such as at near the boiling point for 5-10 minutes or (2) aging the admixture at relatively low temperatures for a long period of time such as at room temperature for about a day, and in either case, preferably, but not necessarily, under conditions of agitation.

In contrast with the examples of our invention, Examples 1 and 2 which follow illustrate the relative ineffectiveness of the components of our synergistic combination (typically HCl and HF) when employed singly in the preparation of seed.

*Example 1*

A quantity of orthotitanic acid prepared as previously described and containing 45 grams of $TiO_2$ was treated, under vigorous mechanical agitation, with a hydrochloric acid solution containing 18 grams of HCl, to yield a mixture of $TiO_2$ concentration of which was 60 grams per liter. After thorough mixing, and with continued agitation, the preparation was heated to 90° C. in 15 minutes, and maintained at this temperature for approximately 10 minutes, then cooled quickly to 30° C. A portion of the so-prepared seed was withdrawn for observation, and the remainder was coagulated with ammonium hydroxide solution; the coagulum was filtered, washed to remove halide, and repulped with water to form a smooth slurry, free of coarse agglomerated particles, in preparation for use in the hydrolysis of titanium sulfate solution. The withdrawn seed portion was relatively opaque and was colloidally unstable—typical of poor seed. Calcination of a portion of the coagulated and washed seed at 500° C. brought about a 90.5% conversion of the $TiO_2$ to rutile.

Approximately 1% of the coagulated and washed seed, based on the $TiO_2$ contents of the seed and the solution to be hydrolyzed, was incorporated into titanium sulfate solution which had been derived from the attack of ilmenite ore with sulfuric acid. Following this, the admixture was boiled (hydrolyzed), and the precipitated titanium values were recovered, washed, treated with minor amounts of alkali metal salts and phosphate, and calcined to produce rutile pigment, all according to procedures well known to those versed in the art. In order to achieve a rutile content of 99+%, a temperature of 895° C. was required; the pigment product was distinctly inferior to the high-quality rutile titanium dioxide pigments commercially available.

*Example 2*

The procedure of Example 1 was followed, but in place of hydrochloric acid a solution of hydrofluoric acid containing 11 grams of HF was employed in the preparation of the seed.

The seed and the pigment product resulting from its use in the hydrolysis of a titanium sulfate solution were convertible to rutile only upon calcination at excessively high temperatures: calcination of the seed at 500° C. yielded 0% rutile, while calcination of the pigment at 950° C. gave rise to only a 53% conversion to rutile. Upon calcination at the more elevated temperatures required to secure essentially complete conversion of the pigment to rutile, the product obtained, as might be expected, was of much poorer quality than the product of Example 1 or of commercially-produced, high-quality titanium dioxide pigments.

Examples 1 and 2 above demonstrate the preparation of seeds employing: (Example 1) only hydrochloric acid and orthotitanic acid and producing at a concentration of 60 grams $TiO_2$ per liter a seed product unsuitable for the preparation of high-quality rutile pigment; and (Example 2) only hydrofluoric acid and orthotitanic acid which seed product gives rise to $TiO_2$ convertible to rutile only at excessively high temperatures.

*Example 3*

The general procedure of the foregoing examples was followed, but instead of using hydrochloric acid or hydrofluoric acid, singly, in making the seed, a synergistic combination of hydrochloric and hydrofluoric acids, which forms the basis of our present invention, was employed, i.e., 18 grams of HCl plus 0.50 gram of HF. The seed so prepared was colloidally stable and was easily transformed to rutile, as demonstrated by a conversion of 95.0% upon calcination of a portion of the coagulated and washed material at 500° C. The pigment resulting from the use of this seed in a conventional hydrolysis was converted essentially to rutile upon calcination at 860° C. The quality of the pigment product, unlike that of the products of Examples 1 and 2, was comparable to the quality of commercially-produced high-grade rutile pigments.

*Example 4*

The procedure of Example 3 was followed except that the amount of HF employed was 1.26 grams. The seed prepared in this manner was stable, colloidally, and it converted readily to rutile, being 97.5% rutile upon calcination of the coagulated material at 500° C. The employment of this seed in a typical titanium sulfate hydrolysis gave rise to a titanium dioxide which converted to rutile (99+%) upon calcination at 840° C., the product being greatly superior to the products of Examples 1 and 2 and, moreover, superior to the product of Example 3 and to commercially-available, high-quality rutile pigments.

*Example 5*

The procedure of Examples 3 and 4, employing a synergistic combination of HCl and HF, was followed, but the amount of HF used was 1.58 grams. The so-prepared seed was colloidally stable, and calcination of a portion of the coagulated material at 500° C. yielded 96.5% rutile. The hydrolyzate prepared through the use of this seed in a sulfate hydrolysis (performed as in the foregoing examples) converted essentially completely to rutile at 845° C., the pigment product then being equal in quality to that of Example 3.

Examples 3, 4 and 5 demonstrate the synergistic effect obtained at a concentration of approximately 60 grams $TiO_2$ per liter by our preferred combinations of hydrochloric acid and hydrofluoric acid in the practice of our invention. In each of these cases high-quality rutile pigment was obtained.

*Example 6*

The procedure of Example 4 was followed except that 13.5 grams of HCl (instead of 18 grams of HCl) were employed in association with the 1.26 grams of HF and the orthotitanic acid (containing the equivalent of 45 grams $TiO_2$), and the concentration of the $TiO_2$ in the admixture was 131 grams per liter. The seed prepared at this unprecedented high concentration was a perfectly stable colloid, and a portion of the coagulated and washed material yielded 96.5% rutile upon calcination at 500° C. A sulfate-type hydrolysis performed with this seed provided a titanium dioxide pigment which converted readily to rutile upon calcination at 830° C. The pigment product was comparable to commercially-produced, high-grade rutile.

*Example 7*

The procedure of Example 6 was followed except that instead of heating the seed dispersion for 10 minutes at 90° C., it was simply aged for 19 hours at 25° C., whereupon there was produced a good, stable, colloidal seed having the advantage of high concentration, and presenting the further advantage of not requiring heating (or subsequent cooling) and the attending special equipment. The coagulated seed was found to be 96.5% rutile after calcination at 500° C. Moreover, the hydrolytic pigment product converted to rutile upon calcination at 860° C., and the quality of product was equivalent to that of Example 6.

Examples 6 and 7 above demonstrate the use of synergistic combinations of hydrochloric and hydrofluoric acids at a high $TiO_2$ concentration, that is, approximately 130 grams $TiO_2$ per liter, wherein the seed of Example 6 was heated at 90° C. for ten minutes and the seed of Example 7 was simply aged at room temperature (25° C.) for 19 hours. Both seeds gave rise to high-quality rutile pigment products, both providing the advantages over the prior art of increased seed productivity with given equipment and of savings in HCl requirements. Additionally, the seed of Example 7 prepared at room temperature provides the advantage of savings in steam, cooling water, and equipment associated therewith.

*Example 8*

A quantity of orthotitanic acid containing the equivalent of 45 grams of $TiO_2$ was treated, under vigorous mechanical agitation, with a synergistic combination of 18 grams of HCl and 1.26 grams of HF, to yield a mixture the $TiO_2$ concentration of which was 133.5 grams per liter. The preparation was heated to 90° C. in 15 minutes, and maintained at this temperature for 10 minutes, then cooled to room temperature. The seed product possessed excellent colloidal stability. Moreover, it converted readily to rutile, a coagulated and washed portion showing a rutile content of 97% upon calcination at 500° C. Furthermore, the employment of this seed in a titanium sulfate hydrolysis gave rise to a titanium dioxide which converted to 99+% rutile at 835° C. The product was distinctly superior to commercially-available, high-quality rutile pigments.

Example 8 above is similar to Example 6 except as to the amount of HCl employed, that is, 0.4 gram HCl:1.0 gram $TiO_2$ in Example 8 and 0.3 gram HCl:1.0 gram $TiO_2$ in Example 6. The seed of Example 8 gave rise to a rutile pigment product of superior quality. It is important to note that prior art inventors never succeeded in obtaining workable rutile seeds of concentrations approaching those delineated in Examples 6, 7 and 8 of the present specification.

While in the preparation of our seeds as in Examples 3, 4, 5, 6, 7 and 8 of our invention we have described the particular use of hydrofluoric acid in conjunction with hydrochloric acid and orthotitanic acid, we can employ, in place of the hydrofluoric acid, hydrofluoric acid-forming materials such as the alkali metal and alkaline earth metal fluoride compounds. Furthermore, instead of hydrochloric acid we can substitute therefor the chemically equivalent weight of hydrobromic, hydriodic or nitric acid.

In our examples above we have determined the crystal structure of the calcined seed and hydrolyzate by X-ray diffraction pattern as is well known to the art. Thus, in the examples given our seed was converted essentially completely to the rutile structure by heating at 500° C. for about an hour as indicated.

Among the many benefits which can be obtained by the process of our invention are:

(1) Savings are achieved in the manufacture of rutile seed through our use of lower amounts of hydrochloric acid than called for in the prior art.

(2) Our seeds, of concentrations up to about 180 grams of $TiO_2$ per liter, which concentrations are distinctly higher than those contemplated by the prior art, provide the attending advantage of increased seed-$TiO_2$ productivity in given equipment.

(3) Our novel seeds can be prepared at room temperature, thereby rendering their preparation less sensitive to the effects of time as compared with the elevated temperature technique. Attendant advantages are thus possible through savings in steam, cooling water, and equipment associated therewith.

(4) Our seeds are more stable, colloidally, than those of the prior art.

(5) Our seeds possess rutile-inducing and yield-inducing characteristics superior to those of the prior art. Consequently, the hydrolyzates produced by employing our seeds convert to rutile at temperatures lower than those required by hydrolyzates of the prior art; this results in superior pigment products via our process.

Of course, it will be understood by those skilled in the art that, in the above examples, variations in the amounts and type of conditioning agents employed in association with the hydrolyzate in preparation for calcination, viz., alkali metal salts and phosphate, can lead to variations in the temperature required for essentially complete conversion of the hydrolyzate to rutile. Actually, in each of the above examples, the following combination of conditioning compounds was employed:

| | Percent |
|---|---|
| $Na_2CO_3$ | 0.40 |
| $Li_2CO_3$ | 0.075 |
| $NH_4H_2PO_4$ | 0.20 |

Further, it should be understood that, while in the above examples of our invention (3, 4, 5, 6, 7 and 8) the amounts of HF employed in association with HCl correspond to our preferred range of 0.011 gram HF:1.00 gram $TiO_2$ to 0.035 gram HF:1.00 gram $TiO_2$, some benefits also derive from the use of lesser or greater amounts of HF.

Likewise, it should be understood that, whereas in the above examples of our invention (3, 4, 5, 6, 7 and 8) the amounts of HCl employed in association with HF correspond to our preferred range of 0.3 gram HCl:1.0 gram $TiO_2$ to 0.4 gram HCl:1.0 gram $TiO_2$, lesser or greater amounts of HCl are also operable.

Resort can be had to modifications and equivalents falling within the scope of our invention and the appended claims.

Having thus described our invention, we claim:

1. In the process of preparing a rutile-inducing seed in which a mixture of orthotitanic acid and an aqueous acid selected from the group consisting of hydrochloric, hydrobromic, hydriodic and nitric, in which the acid is employed in an amount less than about one mole per mole of $TiO_2$, is cured to form a rutile-inducing seed dispersion, the improvement which consists in effecting the curing in the presence of from 0.1 to 5.0% of hydrofluoric acid by weight of the $TiO_2$.

2. A process for producing a stable colloidal rutile-inducing and yield-inducing seed which comprises treating washed and purified orthotitanic acid under conditions of agitation with a combination of a hydrofluoric acid-forming material, the amount of hydrofluoric acid formed being from about 0.001 gram to 0.05 gram per gram of titanium dioxide, and an inorganic acid selected from the group consisting of hydrochloric acid, hydrobromic acid, hydriodic acid and nitric acid, the amount of said inorganic acid being from about 0.2 gram to 0.5 gram for the hydrochloric acid and a chemically equivalent weight for the hydrobromic acid, hydriodic acid and nitric acid, per gram of titanium dioxide and thereafter curing the admixture.

3. A process according to claim 2 wherein the admixture is cured by aging it at room temperature.

4. A process according to claim 2 wherein the inorganic acid is hydrochloric acid.

5. A process according to claim 2 wherein the stable colloidal seed contains the equivalent of up to about 180 grams of titanium dioxide per liter.

6. A process according to claim 2 wherein the amount of hydrofluoric acid formed is from about 0.01 gram to 0.035 gram per gram of titanium dioxide and the amount of inorganic acid is from about 0.3 gram to about 0.4 gram for the hydrochloric acid and a chemically equivalent weight for the hydrobromic acid, hydriodic acid and nitric acid per gram of titanium dioxide.

7. A process according to claim 4 wherein the amount of formed hydrofluoric acid is from about 0.01 gram to about 0.035 gram per gram of titanium dioxide and the amount of hydrochloric acid is from about 0.3 gram to about 0.4 gram per gram of titanium dioxide.

8. A cured, stable colloidal rutile-inducing and yield-inducing seed comprising a dispersion of hydrated titanium oxide in a mixture of from about 0.001 gram to 0.05 gram of hydrofluoric acid per gram of titanium dioxide and an inorganic acid selected from the group consisting of hydrochloric acid, hydrobromic acid, hydriodic acid and nitric acid, the amount of said inorganic acid being from about 0.2 gram to about 0.5 gram for the hydrochloric acid and a chemically equivalent weight for the hydrobromic acid, hydriodic acid and nitric acid per gram of titanium dioxide.

9. A stable seed according to claim 8 wherein the inorganic acid is hydrochloric acid.

10. A stable seed according to claim 8 wherein the seed composition contains the equivalent of up to about 180 grams of titanium dioxide per liter.

11. The stable seed according to claim 8 wherein the amount of hydrofluoric acid is from about 0.01 gram to 0.035 gram per gram of titanium dioxide and the amount of inorganic acid is from about 0.3 gram to 0.4 gram for the hydrochloric acid and a chemically equivalent weight for the hydrobromic acid, hydriodic acid and nitric acid per gram of titanium dioxide.

12. The stable seed according to claim 11 wherein the inorganic acid is hydrochloric acid.

13. A process for hydrolyzing a titanium sulfate solution which comprises treating said solution with from about 0.5% to 1.5%, based on the weights of titanium dioxide, of a seed prepared by treating a washed and purified orthotitanic acid with a combination of hydrofluoric acid in an amount of from about 0.001 gram to 0.05 gram per gram of titanium dioxide, and an inorganic acid selected from the group consisting of hydrochloric acid, hydrobromic acid, hydriodic acid and nitric acid, the amount of said inorganic acid being from about 0.2 gram to 0.5 gram for the hydrochloric acid and a chemically equivalent weight for the hydrobromic acid, hydriodic acid and nitric acid, per gram of titanium dioxide.

14. A process according to claim 13 wherein the inorganic acid used to prepare the seed is hydrochloric acid.

15. In a process for preparing rutile titanium dioxide wherein a titanium sulfate solution is treated with a small quantity by weight of a colloidal seed and wherein the hydrolyzate resulting from said treatment is washed, dried and calcined, the improved process which comprises treating said solution with from about 0.5% to 1.5%, based on the weights of titanium dioxide, of a seed prepared by treating a washed and purified orthotitanic acid with a combination of hydrofluoric acid in an amount of from about 0.001 gram to 0.05 gram per gram of titanium dioxide, and an inorganic acid selected from the group consisting of hydrochloric acid, hydrobromic acid, hydriodic acid and nitric acid, the amount of said inorganic acid being from about 0.2 gram to 0.5 gram for the hydrochloric acid and a chemically equivalent weight for the hydrobromic acid, hydriodic acid and nitric acid, per gram of titanium dioxide.

16. The process according to claim 15 wherein the inorganic acid used in preparing the seed is hydrochloric acid.

17. The process according to claim 15 wherein the seed contains the equivalent of up to about 180 grams of $TiO_2$ per liter.

18. The process according to claim 15 wherein the seed is prepared by treating orthotitanic acid with from about 0.01 gram to about 0.035 gram of hydrofluoric acid per gram of titanium dioxide, and a small amount of an acid selected from the group consisting of hydrochloric acid, hydrobromic acid, hydriodic acid and nitric acid, said small amount being about 0.3 gram to about 0.4 gram for the hydrochloric acid and a chemically equivalent weight for the hydrobromic acid, hydriodic acid and nitric acid, per gram of titanium dioxide.

References Cited in the file of this patent

UNITED STATES PATENTS

| | | |
|---|---|---|
| 2,571,150 | Mayer | Oct. 16, 1951 |
| 2,576,483 | Schultz | Nov. 27, 1951 |

OTHER REFERENCES

Barksdale: "Titanium," The Ronald Press Co., 1949, pp. 64–65.